United States Patent Office 3,177,166
Patented Apr. 6, 1965

3,177,166
ANTIOXIDANTS COMPRISING REACTION PRODUCTS OF LIQUID RUBBERS AND PHENOLS AND COMPOSITIONS CONTAINING SAME
James T. Gregory, Akron, and Roger E. Morris, Cuyahoga Falls, Ohio, assignors to The B. F. Goodrich Company, New York, N.Y., a corporation of New York
No Drawing. Filed Jan. 26, 1961, Ser. No. 84,977
11 Claims. (Cl. 260—5)

This invention relates to novel polymeric antioxidants and novel elastomeric and plastic compositions stabilized therewith and more particularly pertains to polymers containing phenolic hydroxyl group substituents, to novel rubber and plastic compositions stabilized therewith and to methods for preparing said polymers and said stabilized rubbery and plastic compositions.

It is well known to those skilled in the art that organic chemicals containing certain types of phenolic hydroxyl groups, such as the cresols and other alkylated phenolic compounds, are useful for stabilizing numerous types of materials against oxygen deterioration. It is also well known that the foregoing types of antioxidants are quite mobile and tend to migrate readily when they are incorporated into a rubber or plastic matrix. The aforementioned mobility or migration tendency inherent in most antioxidants has proven to be most vexing, particularly in the manufacture of light colored rubber and plastic articles and in the construction of light colored side wall tires wherein staining by and blooming of the antioxidant continues to be a problem. It is also well known that the standard antioxidants used in rubber filaments employed in rubber-fabric elastic combinations tend to become removed by extraction upon repeated washing and/or dry cleaning with the resulting deterioration of the rubber filaments by action of oxygen. There obviously is a need for an effective antioxidant which is also immobile when incorporated into a rubber or plastic matrix.

It is therefore an object of the present invention to provide a novel class of non-volatile, non-extractable, non-migrating antioxidants. It is also an object to provide novel rubbery and plastic compositions which are non-staining and resistant to oxidation. Still another object is the provision of a process for preparing novel non-migrating antioxidants. Another object is the provision of a method for preparing non-staining, oxygen resistant rubbery and plastic compositions.

The foregoing and other objects are accomplished by this invention as a reading of the following description and examples will demonstrate. Numerous changes and modifications can be made in the specific embodiments disclosed herein without a departure from the spirit and scope of this invention which is specifically set out in the appended claims.

We have discovered a novel composition comprising the reaction product of a polymer of a conjugated diene and an aromatic hydroxy compound having at least one hydroxyl group attached to a carbon atom in an aromatic nucleus.

The conjugated diene polymers most useful as starting materials for the preparation of the polymeric antioxidants in the present invention are homopolymers and interpolymers of conjugated dienehydrocarbons having from 4 to 8 carbon atoms such as butadiene-1,3, 2-methyl-butadiene-1,3, 1-methyl-butadiene-1,3, 2,3-dimethyl-butadiene-1,3, 2-ethyl-butadiene-1,3, 2,3-diethyl-butadiene-1,3, and the like. Most preferred dienes in the present invention are butadiene-1,3 and 2-methyl-butadiene-1,3 (isoprene). The diene interpolymers which are most useful in the present invention are those made up of a major proportion of diene units. Diene interpolymers of the foregoing type can be made with one or more other monomers containing a copolymerizable $CH_2=C<$ group. Such other monomers include the aralkenyl hydrocarbons having a $CH_2=C<$ group attached to an aryl group having from 8 to 12 carbon atoms such as styrene, alpha-methyl styrene, vinyl toluene, the vinyl xylenes, the divinyl benzenes, the trivinyl benzenes and the like; the alpha-beta unsaturated nitriles having from 3 to 6 carbon atoms such as acrylonitrile, methacrylonitrile, vinylidene cyanide, and the like; the vinyl esters having from 3 to 14 carbon atoms such as vinyl formate, vinyl acetate, vinyl propionate, vinyl laurate and vinyl benzoate and similar alpha-beta unsaturated esters such as isopropenyl acetate and the like; the alkyl esters of acrylic acid having from 4 to 15 carbon atoms such as methyl acrylate, ethyl acrylate, butyl acrylate, dodecyl acrylate and the like; the alkyl esters of methacrylic acid having from 5 to 16 carbon atoms such as methyl methacrylate, ethyl methacrylate, butyl meathcrylate, 2-ethyl hexyl methacrylate, decyl methacrylate and dodecyl methacrylate.

Preferred as other monomers are styrene and acrylonitrile.

The preferred diene polymers for use as starting materials in the preparation of the polymeric antioxidants embodied herein are diene polymers of the foregoing types containing more than 50 percent by weight of the diene and having less than about 50% by weight of the diene units in said polymers in the 1,4-configuration. Polymers of this type are exemplified by predominantly 1,2-polybutadiene, predominantly 3,4-polyisoprene and the various aforementioned copolymers of butadiene having the butadiene present predominantly in the 1,2 or 3,4-structure.

Most preferred as starting polymers in the preparation of the polymeric antioxidants of the present invention are those of the foregoing types containing at least 70% by weight of the diene, having molecular weights of from 500 to 15,000 and having less than 20% of the diene present in the 1,4-configuration.

The hydroxyl compounds most useful in the practice of the present invention are those containing at least one hydroxyl group attached to an aromatic carbon atom and are known in the art as phenols. Preferred are the compounds of the foregoing type conforming to the structure $R(OH)_n$ wherein R is an aromatic hydrocarbon or nuclear alkylated hydrocarbon having from 6 to 15 carbon atoms, the —OH is phenolic and $n$ is a whole number of from 1 to 2. Specific compounds of the foregoing type embodied herein include phenol, p-nonyl phenol, the cresols, 6-t-butyl-o-cresol, 2,4-dimethyl phenol, 3,4-dimethyl phenol, catechol and 5,6,7,8-tetrahydro-beta-naphthol and other nuclear alkylated phenols and naphthols in which at least one ortho or para position is open. Also included herein are compounds of the foregoing type wherein all the ortho and para positions are alkylated, at least one of such positions being substituted with an alkyl group which is readily removable with acid such as 2,6-dimethyl-4-t-butyl phenol wherein the t-butyl group is readily removable with an acid catalyst to produce an open para position on the molecule. Most preferred because of their availability and reactivity are phenol, o-cresol, m-cresol and p-cresol.

The polymeric antioxidants embodied herein are prepared by reacting the aforementioned polymer of a conjugated diene with the aromatic hydroxy compound at a temperature of from about 50° C. to about 200° C. and preferably at a temperature of from about 80 to 150° C. The reaction is facilitated with an acid catalyst and it is often desirable to use a solvent as reaction medium. Useful solvents for the foregoing reaction are hexane, benzene, carbon tetracholride, ethylene dichloride and the like. The reaction can preferably be carried out in an excess of the particular aromatic hydroxy compound employed as reactant.

Materials which catalyze the foregoing reaction and are preferred in this invention include alkane sulfonic acids, the halides of boron, the halides of aluminum and the aluminum salts of phenolic compounds. Most preferred as catalysts are mixed alkane sulfonic acids and aluminum phenolates. The catalyst, when used, shows greatest activity in the range of from about 0.001 to 10% by weight based on the weight of the reactants and more preferably from about 0.5 to 1% by weight based on the weight of the reactants.

The preferred polymeric antioxidants embodied herein are those containing from about 10 to 50% and more preferably 15 to 45% by weight of chemically combined phenol. The amount of chemically bound phenol in a given polymeric antioxidant may be determined by weight increase in the reaction, ultraviolet analysis and infrared analysis.

The polymeric antioxidants embodied herein are useful in minor proportions in elastomer and plastic compositions and in compositions of all types which require protection against oxygen deterioration. Among the elastomeric or rubbery materials which can be stabilized with the polymeric antioxidants embodied herein are the rubbery polymers of dienes, preferably open-chain conjugated dienes having from 4 to 8 carbon atoms such as natural rubber which is essentially a polymer of isoprene (cis-1,4-polyisoprene), butadiene-1,3, isoprene, 2,3-dimethyl butadiene-1,3 and the like, synthetic natural rubbers such as cis-1,4-head-to-tail polyisoprene and other polymers obtained from 1,3-dienes by means of directive polymerization; and the rubbery copolymers, terpolymers and the like of these and similar conjugated dienes with at least one copolymerizable monomer such as isobutylene, styrene, acrylonitrile, methyl acrylate, ethyl acrylate, butyl acrylate, methyl methacrylate, 2 vinyl pyridine, etc. The polymeric diene rubbers generally contain at least 50% by weight of the diene and preferably contain from about 55 to 85% by weight of the diene. However, copolymers, terpolymers and other multi-component polymers containing as little as 35% or less by weight of diene can also be employed. For example, polymers of about 35% by weight of butadiene, about 35% by weight of styrene and about 30% by weight of acrylonitrile and of about 97% by weight of isobutylene and about 3% by weight of isoprene can be used. For the purposes of this invention balata, gutta percha, which are isomers of natural rubber and the like which contain available unsaturation, are to be considered as rubbery materials.

Still other rubbery materials can be mixed with the polymeric antioxidants embodied herein such as polymers having curable acid groups obtained by polymerizing a major amount of an open-chain aliphatic conjugated diene with an olefinic unsaturated carboxylic acid, by the reaction of a polymer of a diene with a carboxyl supplying reagent preferably in the presence of a catalyst, by the copolymerization of a diene with an olefinically unsaturated copolymerizable compound hydrolyzable to form an acid group, by copolymerization of an alkyl ester of an acrylic type acid with an olefinically unsaturated carboxylic acid, the hydrolysis of an alkyl ester of acrylic acid or the copolymerization of a major amount of a monoolefin or isoolefin with a copolymerizable compound hydrolyzable to form groups containing bound —COOH. Still another rubbery material can be employed such as polymers formed by the copolymerization of dienes with alkyl acrylates, by the polymerization of alkyl acrylates alone, and by the polymerization of an alkyl acrylate with at least one other olefinically unsaturated monomer which then are hydrolyzed to obtain curable —COOH groups. In place of polymers having —COOH groups, polymers having groups such as —COOR, —COCl, —CONH$_2$, —COONH$_4$ and —COOMe, where the Me is a metal, and the like and which are convertible to —COOH groups by ammonolysis, hydrolysis, or similar reaction, for example by treating such polymers with dilute mineral acids or dilute alkali can also be employed after such groups have been converted to a curable —COOH group.

Polymeric vulcanizable synthetic rubber formed by the polymerization of an acrylic acid ester, for example, ethylacrylate or butylacrylate, or mixtures of an acrylic acid ester or by the copolymerization of an acrylic acid ester with a chlorine containing monomer such as a minor amount of chloroethyl vinyl ether, vinyl chloride, betachloroethyl acrylate or dichlorodifluoro ethylene or with acrylonitrile, ethylene or styrene can likewise be used.

Polysulfide rubbers, rubbery polyesterurethanes, and polyetherurethanes can also be stabilized with the polymeric antioxidants embodied herein. Mixtures of the foregoing rubbers can also be used.

Plastic compositions useful in this invention include plasticized and unplasticized homopolymers and copolymers of vinyl halides such as vinyl chloride, vinyl bromide, vinyl fluoride, and the vinylidene halides. The polymeric monoolefins such as ethylene, propylene, butene-1 and the like are useful in this invention.

The polymeric antioxidants of this invention are most useful as antioxidants in the range of from about 0.1 to 10% by weight in rubbery and plastic materials and more preferably in the range of from 0.5 to 5% by weight.

The polymeric antioxidants embodied in this invention can be employed in minor proportion in mixtures of plastic and rubbery materials and it is to be understood that additional materials can be used in the plastic and rubbery compositions such as the conventional pigments, reinforcing agents, vulcanization agents, accelerators and the like, which are well known in the art. It is also to be understood that the polymeric antioxidants embodied herein can be incorporated into the dry rubber or plastic material as well as being incorporated into latices, suspensions and solutions of natural and synthetic rubbers and plastics.

The following examples illustrate the products and processes of this invention. In the examples, the amounts of the various ingredients are expressed as parts by weight unless otherwise indicated.

EXAMPLE I

A solution of 162 g. of liquid polybutadiene (prepared with an alkali metal catalyst, having a cryoscopic molecular weight of 956 and containing less than about 20% 1,4-structure and more than about 80% 1,2-structure) in 400 g. of o-cresol was placed in a reaction vessel. The solution was brought to a boil for a short time at about 9 mm. pressure to remove volatile materials. In a second reaction vessel a dispersion of 4.2 g. of aluminum grit and a few crystals of mercuric chloride in 400 g. of o-cresol was brought to a temperature of 182–186° C. and maintained at this temperature until the aluminum had reacted completely as indicated by cessation of hydrogen evolution.

The solution of polybutadiene in o-cresol was next added slowly to the reaction vessel containing the o-cresol and aluminum o-cresolate. An additional 172 g. of o-cresol were used to complete the transfer. The resulting reaction mixture was maintained at 130–141° C. with stirring in an inert atmosphere (nitrogen) for two hours. The resulting solution was passed through a fritted glass filter and the filtrate was mixed with 23 g. of ethanol and was stirred for about 18 hours at room temperature. The excess of o-cresol was removed by distillation at reduced pressure (9 mm.) and a viscous residue remained in the reaction vessel. The product was diluted with 150 ml. of ethanol and the resulting fluid solution was poured into a stirred solution of 1000 ml. of methanol, 475 ml. of water and 25 ml. of concentrated hydrochloric acid while the solution was maintained at about 0° C. The product precipitated as a grainy solid. The dispersion was stirred for an hour, the solid was then removed by rapid filtration and was resuspended in a solution of 750 ml. of methanol, 240 ml. of water and 10 ml. of concentrated hydrochloric acid. The resulting suspension was stirred at 5–10° C. for an hour. The product was removed by filtration and was dried to a constant weight of 252.5 g. A perceptible odor of o-cresol was still apparent so the product was again extracted with the methanol-water-hydrochloric acid solution described above. The dried product was then dissolved in hot chloroform, the solution was filtered, the filtrate was concentrated and the residue was poured into a stirred methanol-water-concentrated hydrochloric acid solution. The odorless product was found by weight increase and by ultraviolet absorption analysis to contain 33.7% by weight of chemically bound o-cresol and it softened in the range of 85–100° C.

In a similar manner o-cresol-1,2-polybutadiene reaction productcs were prepared wherein the molecular weight of the 1,2-polybutadiene and the reaction temperature were varied as shown in the table below.

| 1,2-polybutadiene molecular weight | Reaction temperature, °C. | Wt. percent of chemically bound o-cresol in the product |
|---|---|---|
| 2,750 | 135–136 | 34.1 |
| 956 | 132–137 | 32.2 |
| 956 | 127–132 | 31.8 |
| 956 | 125–129 | 23.2 |
| 956 | 132–141 | 33.7 |
| 956 | 155–161 | 38.9 |

The above polymeric antioxidants had softening ranges which varied from as low as 70° C. to as high as 130° C.

In a similar manner o-cresol-3,4-polyisoprene reaction products were prepared using 3,4-polyisoprene (alkali metal catalyzed polymer having less than 20% 1,4-addition product and molecular weights below 15,000).

EXAMPLE II

To a 500 ml. round bottomed flask equipped with stirrer, reflux condenser, thermometer and nitrogen inlet tube were charged 205 g. of p-nonylphenol, 35 g. of a liquid copolymer of about 23% styrene and about 77% butadiene-1,3 (molecular weight of from 8,000 to 10,000) containing less than 50% of the butadiene present in the 1,4-structure and 2.5 g. of mixed alkane sulfonic acids as catalyst. The alkane sulfonic acid mixture consisted of 94% by weight of methane, ethane and propane sulfonic acids having an average of 2 carbon atoms in the alkyl group, 5% of water and 1% of $H_2SO_4$. The resulting solution was stirred in a nitrogen atmosphere at 70–85° C. for about 7 hours. The reaction was mildly exothermic. The reaction mixture was allowed to cool and stand for two days at which time it was poured into 1000 ml. of rapidly stirred methanol. The product precipitated as a finely divided white solid which was extracted twice more with fresh methanol. The product was dried at 55–60° C. in a vacuum oven to give 56 g. (37.5% by weight of p-nonylphenol as determined by weight increase) of a white solid. Analysis by ultraviolet absorption showed the product contained 49.6% by weight of chemically bound p-nonylphenol.

When a copolymer of 30% acrylonitrile and 70% butadiene-1,3 having a molecular weight of about 5,000 and having less than 50% of the diene units present therein in the 1,4 configuration was used in the foregoing procedure similar results were obtained.

Similarly, reaction products of the above liquid styrene-butadiene copolymer with phenol, 2,4-dimethyl phenol, 3,4-dimethyl phenol, catechol, 2,6-dimethyl phenol, 2,6-diisopropyl phenol, 6-t-butyl-o-cresol and 5,6,7,8-tetrahydro-beta-naphthol were prepared and found to be good antioxidants.

EXAMPLE III

Various reaction products of phenolic compounds and low molecular weight diene polymers containing less than about 50% 1,4-diene structure based on the total diene present in the polymer were prepared by the procedure given in Example I. Many of these polymeric antioxidants were incorporated in a standard automobile tire tread stock, the stock was cured and aged in air at 100° C. for 24 and 48 hour periods. The tensile strength of each stock was measured before and after aging and the percent tensile strength retained after the aging period is recorded in Table 1. The tread stock employed throughout this example is as follows:

| | |
|---|---|
| Natural rubber (pale crepe) | 100. |
| ZnO | 5. |
| Stearic acid | 3. |
| Carbon black (EPC) | 50. |
| Mercapto benzothiazole disulfide | 1. |
| Sulfur | 3. |
| Antioxidant | Variable. |

Table 1

| Antioxidant | Parts in Recipe | Percent Tensile Retained | | | |
|---|---|---|---|---|---|
| | | Aged at 100° C. for— | | | |
| | | 24 hrs. | | 48 hrs. | |
| | | Cured at 284° F. for— | | | |
| | | 50′ | 80′ | 50′ | 80′ |
| Reaction product of 1,2-polybutadiene (M.W. 1030) and o-cresol, 33.6% by wt. o-cresol | 1 | 86 | 69 | 73 | 52 |
| | 2 | 73 | 77 | 83 | 69 |
| | 3 | 99 | 91 | 93 | 73 |
| None (control) | 0 | 72 | 49 | 54 | 32 |
| Reaction product of 1,2-polybutadiene (M.W. 900) and 27.5% o-cresol | 3 | 82 | 67 | 75 | 52 |
| Reaction product of 1,2-polybutadiene (M.W. 2750) and 34.1% o-cresol | 3 | 84 | 79 | 75 | 64 |
| Reaction product of 3,4-polyisoprene (M.W. 2150) and 18.7% o-cresol | 3 | 102 | 99 | 88 | 80 |
| Reaction product of 3,4-polyisoprene (M.W. 1400) and 22.4% o-cresol | 3 | 106 | 93 | 95 | 80 |
| Reaction product of 3,4-polyisoprene (M.W. 1400) and 16.5% o-cresol | 3 | 98 | 88 | 88 | 72 |

EXAMPLE IV

Similarly, vulcanizates were prepared from the standard tread recipe given in Example III and the De Mattia flex life was determined. A tread stock containing 3 parts of the reaction product of low molecular weight (1400) substantially 3,4-polyisoprene and 15% o-cresol gave 106,000 flexures to a rating of 9. The control sample containing no antioxidant gave 40,000 flexures to a rating of 9.5. A reaction product of 1,2-polybutadiene and o-cresol at 3 parts in the tread stock gave 135,000 flexures at a rating of 8. In the De Mattia test a rating of 10 represents complete separation.

EXAMPLE V

Antioxidant staining tests were run on a butyl rubber white stock prepared from the following recipe:

| | |
|---|---|
| Butyl rubber (non-stain) | 100. |
| ZnO | 20. |
| $TiO_2$ | 20. |
| Silica | 40. |
| Stearic acid | 2. |
| Ultramarine blue | 0.2. |
| Tetramethyl thiuram disulfide | 1.0. |
| Mercapto benzothiazole | 1.0. |
| Sulfur | 1.5. |
| Antioxidant | Variable. |

The stocks were cured in standard molds at 293° F. for 30 minutes after first being mill mixed thoroughly at temperatures not exceeding about 215° F. The resulting white vulcanizates were cut with a standard die to samples having the dimensions of 1″ x 1″ x 0.06″. These samples were aged to equilibrium staining (427 hours) at 70° C. under a Hanovia U.V. lamp. The aged samples were then examined with a Photovolt reflectometer and the change in reflectance versus antioxidant level was determined the base being a control white vulcanizate containing no antioxidant. A conventional antioxidant having the structure

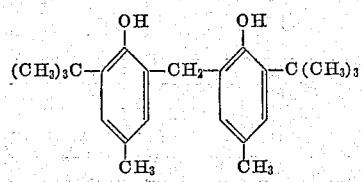

was used for comparison with the reaction product of a 3,4-polyisoprene (M.W. 1400) and 28.8% o-cresol. Neither sample showed any appreciable staining in this test.

EXAMPLE VI

This example demonstrates the non-mobility or lack of diffusion characteristics of the polymeric antioxidants embodied herein. Black rubber stocks were prepared from a conventional recipe as follows:

| | |
|---|---|
| Cold SBR (23.5% styrene, 76.5% butadiene-1,3) | 77.5 |
| Natural rubber | 22.5 |
| ZnO | 3.0 |
| FEF carbon black | 30.0 |
| Light mineral oil | 4.0 |
| Non-oxidizing rosin | 3.0 |
| Benzothiazyl disulfide | 2.0 |
| Sulfur | 3.0 |
| Antioxidant | Variable |

A white stock containing no antioxidant was also prepared from the recipe given in the preceding example. The black stock was then preformed in a standard mold at 212° F. for 15 minutes. The white stock was also preformed in a standard mold at 295° F. for 30 minutes. The two preformed stocks were then put in a mold and cured simultaneously at 295° F. for 30 minutes to produce a vulcanized laminate consisting of a 0.230″ thickness of black rubber and a 0.02″ thickness of white rubber. The white sides of the resulting laminates were then exposed to an illuminated Hanovia Ultraviolet lamp at 70° C. to "equilibrium stain" or the point at which all samples had reached maximum stain (about 427 hours). The white faces of the thus exposed laminates were then examined with the Photovolt reflectometer and the reflectance drop was noted. The reflectance drop is the difference in reflection between that of a control sample (no antioxidant in the black stock) and the "equilibrium stain" reflectance value of the sample.

| Antioxidant employed in Black stock | Concentration | Reflectance Drop |
|---|---|---|
| None | | 0 |
| Reaction product of 28.8% by wt. o-cresol and 3,4-polyisoprene (M.W. 1400) | 3.0 | 3.0 |
| (CH₃)₃C—[phenol ring CH₃]—CH₂—[phenol ring CH₃]—C(CH₃)₃ | 3.0 | 21.0 |

It is apparent that the polymeric antioxidant diffuses through from the black to the white rubber to a much lesser degree than does a conventional antioxidant of the prior art.

EXAMPLE VII

Polymeric phenolic antioxidants have been found to be extremely useful in plastics and particularly in polyolefins such as polyethylene containing carbon black. The following representative data are given to illustrate the foregoing.

| Antioxidant | Concentration | Carbon Black | Induction Period |
|---|---|---|---|
| (CH₃)₃C—[phenol]—S—[phenol C(CH₃)₃]—HO (with CH₃ groups) | 0.1 | 0 | 55 |
| (CH₃)₃C—[phenol]—S—[phenol C(CH₃)₃]—HO (with CH₃ groups) | 0.1 | 3.0 | 80 |
| Reaction product of 1,2-polybutadiene (M.W. 956) and 73.4% o-cresol melting range 70–95° C | 0.1 | 0 | 6 |
| Do | 0.2 | 0 | 21 |
| Do | 0.1 | 3.0 | 142 |

The induction period is the time in hours required for a given sample of plastic (in the above case, polyethylene) to absorb 10 ml. of oxygen per gram of sample when exposed to oxygen in a calibrated absorption apparatus. It is apparent from the above that the polymeric antioxidant is even more effective in polyethylene containing carbon black than one of the best materials for this purpose known in the art at the time of the present invention.

Several reactions of o- and p-cresols with 3,4-polyisoprenes in the 20,000 to 280,000 molecular weight range and with natural and synthetic cis-1,4-polyisoprene as well as styrene-butadiene copolymer having most of the butadiene units present in the 1,4-configuration gave products which were highly cross-linked and cyclized containing little or no chemically bound cresol. Most of the products could not be fused alone or mill mixed with rubber and those which could be mixed with rubber demonstrated negligible antioxidant activity. Natural rubber was heat depolymerized to give a cis-1,4-polyisoprene product of molecular weight 17,000–25,000 as determined by viscosity measurement. Reaction of the depolymerized natural rubber with o-cresol, for instance, was extremely slow and the products were mainly cyclized, insoluble did not demonstrate antioxidant activity in rubber.

In following the teaching of U.S. Patent No. 1,852,295, Example 2, 20 g. of o-cresol and 20 g. of stannic chloride crystals were milled into 100 g. of pale crepe rubber. On standing for a week the rubber turned hard and tough. After two months standing the product appeared to be vulcanized, could not be milled, fused or dissolved in chloroform. This material did not appear to have any antioxidant activity but was highly cyclized.

We claim:
1. An antioxidant for rubbery and plastic materials which by virtue of its polymeric nature is essentially immobile when incorporated in a matrix thereof, said antioxidant being the reaction product of reactants consisting of:
   (a) a diene polymer selected from the class consisting of:
      (1) homopolymers of conjugated diene hydrocarbons having from 4 to 8 carbon atoms, and
      (2) copolymers of more than 50% by weight of a conjugated diene hydrocarbon having from 4 to 8 carbon atoms with a lesser amount of a copolymerizable compound containing the $CH_2=C<$ group,
   said homopolymers (1) and copolymers (2) being characterized by:
      (i) having a molecular weight in the range of 500 to 15,000 and
      (ii) having less than 50% of the diene hydrocarbon units therein present in the 1,4-configuration, and
   (b) a phenolic compound of the structure $R-(OH)_n$ wherein
      R is an aromatic hydrocarbon radical of 6 to 15 carbon atoms having each connecting valence on a nuclear carbon atom,
      n is an integer from 1 to 2 inclusive,
   said reaction product containing from 10 to 50 parts by weight of (b) chemically combined with 100 parts by weight of (a).

2. An antioxidant in accordance with claim 1 wherein (a) is a liquid polybutadiene in which more than 80% the butadiene units are present in the 1,2-structure, said antioxidant being a solid material having a softening point in the range of 70 to 130° C.

3. An antioxidant in accordance with claim 2 wherein (b) is ortho-cresol.

4. An antioxidant in accordance with claim 1 wherein (a) is a liquid polyisoprene in which more than 80% of the isoprene units are present in the 3,4-structure.

5. An antioxidant in accordance with claim 4 wherein (b) is ortho-cresol.

6. An antioxidant in accordance with claim 1 wherein (a) is a liquid copolymer of about 77% butadiene and about 23% styrene.

7. An antioxidant in accordance with claim 6 wherein (b) is p-nonyl phenol.

8. An antioxidant in accordance with claim 6 wherein (b) is a cresol.

9. A composition of matter comprising a rubbery material selected from the class consisting of:
   natural and synthetic rubbery homopolymers of isoprene
   rubbery homopolymers of butadiene
   rubbery copolymers of butadiene with styrene
   rubbery copolymers of isobutylene with isoprene
and, as a flex-resisting, non-staining, non-migrating antioxidant therefor, from 0.1 to 10 parts by weight based on 100 parts by weight of said rubbery material of antioxidant as defined in claim 1.

10. A composition of matter comprising about 100 parts by weight of polyethylene, about 3 parts by weight of carbon black and, as a non-migrating antioxidant for said polyethylene, about 0.1 to 5 parts by weight of antioxidant as defined in claim 1.

11. The method of converting a liquid diene polymer as defined in (a) of claim 1 into a solid polymeric antioxidant which comprises dissolving said diene polymer in an excess of a liquid phenolic compound as defined in (b) of claim 1, adding to the resulting solution from 0.001 to 10% by weight based on the weight of reactants of an acid catalyst selected from the class consisting of alkane sulfonic acids, boron halides, aluminum halides, and aluminum phenolates, heating said solution containing said catalyst to a temperature of 50 to 200° C. for a time sufficient to effect reaction of about 10 to 50 parts by weight of said liquid phenolic compound with about 100 parts by weight of said liquid diene polymer and thereby form a solid product, and separating said solid product from the reaction medium.

References Cited by the Examiner
UNITED STATES PATENTS

| | | | |
|---|---|---|---|
| 2,158,530 | 5/39 | Williams | 260—768 |
| 2,525,655 | 10/50 | D'Ianni | 260—768 |
| 2,558,812 | 7/51 | Bloch | 260—62 |
| 2,649,432 | 8/53 | Little | 260—43 |
| 2,809,372 | 10/57 | Frederick et al. | 260—5 |
| 2,816,286 | 12/57 | Harvey et al. | 260—5 |
| 2,830,970 | 4/58 | Tawney | 260—62 |
| 2,892,004 | 6/59 | Bartl et al. | 260—768 |
| 2,965,624 | 12/60 | Anderson | 260—94.2 |

MURRAY TILLMAN, *Primary Examiner.*

D. ARNOLD, LEON J. BERCOVITZ, WILLIAM H. SHORT, *Examiners.*